US012719116B2

(12) United States Patent
Schmitt et al.

(10) Patent No.: US 12,719,116 B2
(45) Date of Patent: Aug. 25, 2026

(54) BATTERY MODULE

(71) Applicant: Robert Bosch GmbH, Stuttgart (DE)

(72) Inventors: Markus Schmitt, Tamm (DE); Ralph Glemser, Brackenheim (DE)

(73) Assignee: Robert Bosch GmbH, Stuttgart (DE)

(*) Notice: Subject to any disclaimer, the term of this patent is extended or adjusted under 35 U.S.C. 154(b) by 656 days.

(21) Appl. No.: 18/171,416

(22) Filed: Feb. 20, 2023

(65) Prior Publication Data

US 2023/0268592 A1 Aug. 24, 2023

(30) Foreign Application Priority Data

Feb. 22, 2022 (DE) ..................... 10 2022 201 858.3

(51) Int. Cl.
*H01M 50/159* (2021.01)
*H01M 50/186* (2021.01)

(52) U.S. Cl.
CPC ....... *H01M 50/159* (2021.01); *H01M 50/186* (2021.01)

(58) Field of Classification Search
CPC .......................... H01M 50/159; H01M 50/186
See application file for complete search history.

(56) References Cited

U.S. PATENT DOCUMENTS

| | | | |
|---|---|---|---|
| 2003/0013009 | A1 | 1/2003 | Dansui et al. |
| 2009/0023063 | A1 | 1/2009 | Asahina et al. |
| 2015/0064514 | A1 | 3/2015 | Wu et al. |
| 2016/0118635 | A1 | 4/2016 | Keller et al. |
| 2019/0386258 | A1 | 12/2019 | Lai et al. |

FOREIGN PATENT DOCUMENTS

| | | | |
|---|---|---|---|
| CN | 207233788 | U | 4/2018 |
| DE | 102017204530 | A1 | 9/2018 |
| DE | 102017217024 | A1 | 3/2019 |
| DE | 102019101402 | A1 | 5/2020 |
| DE | 102018131575 | A1 | 6/2020 |
| DE | 102019103049 | A1 | 8/2020 |
| DE | 102019210790 | A1 | 1/2021 |
| DE | 102019131152 | A1 | 5/2021 |
| DE | 102019220034 | A1 | 6/2021 |
| DE | 102020104455 | A1 | 8/2021 |

OTHER PUBLICATIONS

DE102017204530A1 (Year: 2017).*
Non-final Office Action issued by the U.S. Patent Office for U.S. Appl. No. 18/177,899 dated Oct. 29, 2025 (13 pages).
Final Office Action issued by the U.S. Patent Office for U.S. Appl. No. 18/177,899 dated May 4, 2026 (14 pages).

* cited by examiner

*Primary Examiner* — Jane J Rhee
(74) *Attorney, Agent, or Firm* — Michael Best & Friedrich LLP

(57) ABSTRACT

A battery module includes a housing element (2) made of a metallic material (3) and a lid element (4) made of a metal material (5), which are connected to one another while forming a common internal space (6) configured to accommodate a plurality of battery cells (7) by the formation of a plurality of plastic deformations (8) of the lid element (4) that are arranged so as to be spaced apart from one another, in such a way that an electrical contact is established between the housing element (2) and the lid element (4).

11 Claims, 3 Drawing Sheets

BATTERY MODULE

BACKGROUND

The invention proceeds from a battery module.

A battery module comprises a plurality of individual battery cells, each having a positive voltage tap and a negative voltage tap, wherein the respective voltage taps are electrically connected to one another for an electrically conductive serial and/or parallel connection of the plurality of battery cells, and thus can be connected to the battery module. In particular, the battery cells can each comprise a first voltage tap, in particular a positive voltage tap, and a second voltage tap, in particular a negative voltage tap, which are electrically conductively connected to one another by means of cell connectors, so that an electrically serial and/or parallel circuitry is configured.

Battery modules themselves are also interconnected into batteries and/or entire battery systems.

The prior art is, for example, US 2009/0023063 and CN 207233788 U.

SUMMARY

A battery module having the features of the disclosure provides the advantage that a reliable configuration of an electrically conductive connection can be formed between a housing element of the battery module and a lid element of the battery module.

Particularly advantageously, screw connections are not used.

According to the present invention, a battery module is provided for this purpose with a housing element, which is formed from a metallic material, in particular aluminum, and with a lid element, which is formed from a metallic material, in particular aluminum. The housing element and the lid element are connected to one another in the form of a common internal space. This internal space is configured so as to hold a plurality of battery cells. Preferably, a plurality of battery cells is housed in the interior.

Furthermore, the housing element and the lid element are interconnected by forming a plurality of plastic deformations that are arranged so as to be spaced apart from one another in such a way that an electrical contact is formed between the housing element and the lid element. An electromagnetically compatible connection between the housing element and the lid element is thereby formed.

In one embodiment of a battery module according to the invention, additional connecting elements, such as screw connections, can be omitted for the electrical contact of the housing element with the lid element. The electromagnetically compatible connection between the housing element and the lid element can be formed by means of the plurality of plastic deformations of the lid element. Overall, this can save costs and simplify the handling process.

For this purpose, it is also noted at this point that electrical contact is made between the housing element and the lid element due to the plastic deformations, in particular because the plastic deformations mechanically and electrically contact the housing element. In particular, the plastic deformations are configured at defined locations and at a defined distance to one another. Thus, a connection with electromagnetic compatibility (or briefly EMV) between the housing element and the lid element can be formed.

It is expedient for the lid member to have a recess directly adjacent to a plastic deformation. Such a recess can in particular be configured as a punching, for example. Overall, this provides the advantage that a simpler plastic deformation can be formed.

Furthermore, it is advantageous for the housing element to have a circumferential rib. The rib is in particular arranged in direct mechanical contact with a plastic deformation of the plurality of plastic deformations.

Furthermore, it is advantageous for the plurality of plastic deformations to be respectively arranged below the rib.

It should be noted at this point that the rib can in particular form a radius and/or a bevel so that easier assembly can be enabled.

According to a preferred aspect of the invention, a sealing element is further arranged between the housing element and the lid element in such a manner that the interior is sealed against an environment in a fluid-tight manner.

The lid element or the housing element can preferably form the sealing element. It should be noted at this point that the sealing element can of course also preferably be configured as a separate component.

The arrangement of a sealing element offers, on the one hand, the particular advantage that the sealing element can form a return force on the lid element, which ensures that the direct mechanical contact and thus the electrical contact between the plurality of plastic deformations and the rib is permanently formed.

Furthermore, the arrangement of one sealing element on the other offers the particular advantage that a sealing of the internal space of the battery module can be formed against an environment.

At this point, it is noted that at least during manufacture of the battery module, a direct mechanical contact between the lid element and the housing element can be formed as a hard stop.

It is expedient when individual plastic deformations are arranged so as to be spaced apart from one another and/or the housing element of the battery module, in particular the rib, and the lid element are arranged so as to be spaced apart from one another in such a manner that an electromagnetic shielding of the internal space against the environment is formed. It should be noted at this point that a certain distance between the individual plastic deformation must be observed in order to form an electromagnetic shielding of the internal space of the battery module against the environment and a certain distance between the housing element and the lid elements must also be observed.

Preferably, the housing element is configured as a die-cast aluminum housing. In particular, the housing element is formed from an aluminum alloy.

Furthermore, preferably, the lid element is configured as a deep-drawn part made of an aluminum alloy. In particular, the aluminum alloy is comparatively easily deformable.

It is particularly advantageous when the sealing element is arranged on a beveled surface. In particular, the sealing element is arranged directly adjacent to the rib. It is thereby possible to minimize a corrosive undermining of the sealing point. A beveled surface is understood to mean that this surface is arranged at an angle to a horizontally arranged plane during normal or customary use of the battery module. This makes it possible to ensure an optimum drainage of a condensate that accumulates in the sealing region. In particular, such condensation thus does not remain permanently at the sealing point. Furthermore, additional protection can be established in the case of an already described direct connection between the housing element and the lid element.

In an arrangement of the sealing element directly adjacent to the rib, this rib also serves to permanently position the sealing element.

Furthermore, the distance between the lid element and the housing element in the region of the plurality of plastic deformations is selected in such a way that capillary effects are avoided and condensate can reliably drip off.

BRIEF DESCRIPTION OF THE DRAWINGS

Exemplary embodiments of the invention are illustrated in the drawings and explained in further detail in the following description.

The following are shown.

DETAILED DESCRIPTION

Figure 1:
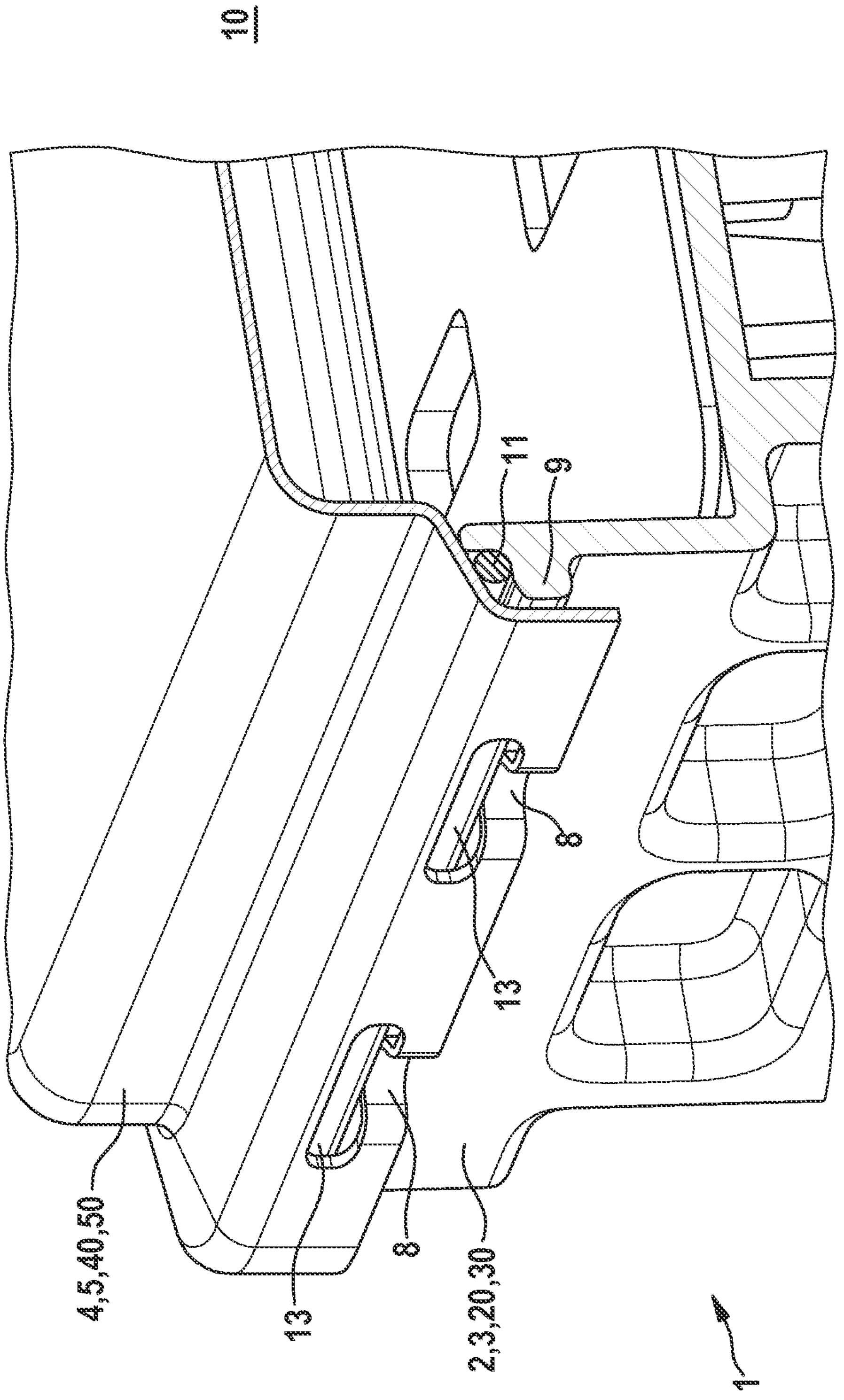
FIG. 1 in a perspective view, a cutout of an embodiment of a battery module according to the invention, FIG. 2 a formation of a plastic deformation, FIG. 3 in a sectional view, an embodiment of a battery module according to the invention, and FIG. 4 in a sectional view, an embodiment of a battery module according to the invention.

In a perspective view, FIG. 1 shows a cutout of an embodiment of a battery module 1 according to the invention.

The battery module 1 comprises a housing element 2, which is formed from a metallic material 3, in particular aluminum 30. According to the embodiment shown in FIG. 1, the housing element 2 of the battery module 1 is preferably configured as an aluminum die-cast housing 20.

The battery module 1 further comprises a lid element, which is formed from a metallic material 5, in particular aluminum 50. According to the embodiment shown in FIG. 1, the lid element 4 is preferably configured as a deep-drawn part 40 made of an aluminum alloy.

The housing element 2 and the lid element 4 are connected to one another in the form of an internal space 6, which cannot be seen in FIG. 1. The internal space 6 is configured so as to accommodate a plurality of battery cells 7, which are also not visible in FIG. 1.

The connection of the housing element 2 and the lid element 4 is configured by means of a plurality of plastic deformations 8 of the lid element 4 that are arranged so as to be spaced apart from one another.

An electrical contact between the housing element 2 and the lid element 4 is thereby established.

Immediately adjacent to a plastic deformation 8, the lid element 4 comprises a recess 13. This provides the advantage that an easier deformation or reforming can be configured.

Furthermore, it can be seen that the housing element 2 comprises a circumferential rib 9, wherein the rib 9 is arranged in direct mechanical contact with a plastic deformation 8. A reliable mechanical and electrical connection can be established by the mechanical contact between the plastic deformation 8 and the rib 9.

The plurality of plastic deformations 8 is respectively arranged below the rib 9.

A sealing element 11 is further arranged between the housing element 2 and the lid element 4 such that the internal space 6 is sealed against an environment 10 in a fluid-tight manner.

In particular, individual plastic deformations 8 are arranged so as to be spaced apart from one another in such a manner that an electromagnetic shielding of the internal space 6 is formed against the environment 10.

Furthermore, the housing element 2 of the battery module 1, in particular the rib 9, as well as the lid element 4 are arranged so as to be spaced apart from one another in such a manner that an electromagnetic shielding of the internal space 6 is formed against the environment 10.

Figure 2:
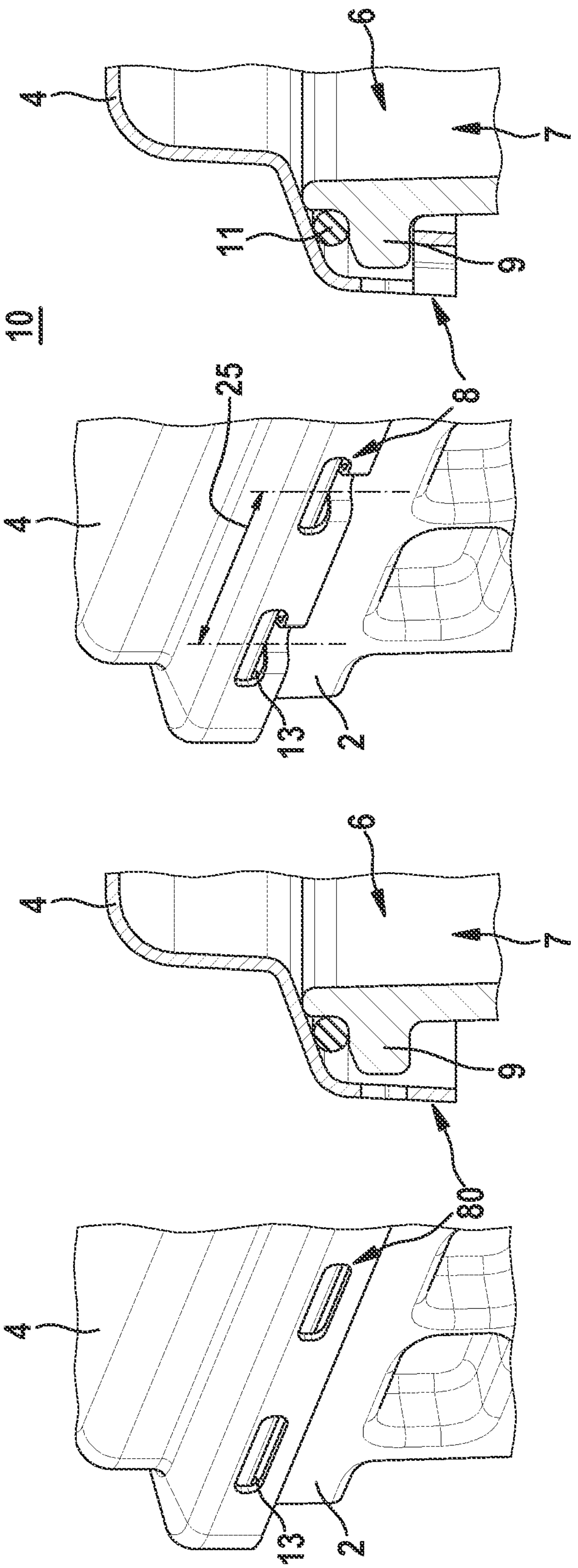

FIG. 2 shows a configuration of a plastic deformation 8. The two left illustrations here show a state 80 before a plastic deformation 8, while the two right illustrations show a state after a plastic deformation 8.

Firstly, the housing element 2 and the lid element 4 can be seen. Furthermore, the recesses 13 can also be seen, which facilitate the deformation into a plastic deformation 8.

In particular, it is noted at this point that the internal space 6 can also be seen, in which a plurality of battery cells 7 are accommodated.

Furthermore, it can be seen in this case that two plastic deformations 8 are spaced apart from one another by a distance 25, such that an electromagnetic shielding of the internal space 6 is formed against the environment 10.

Figure 3:
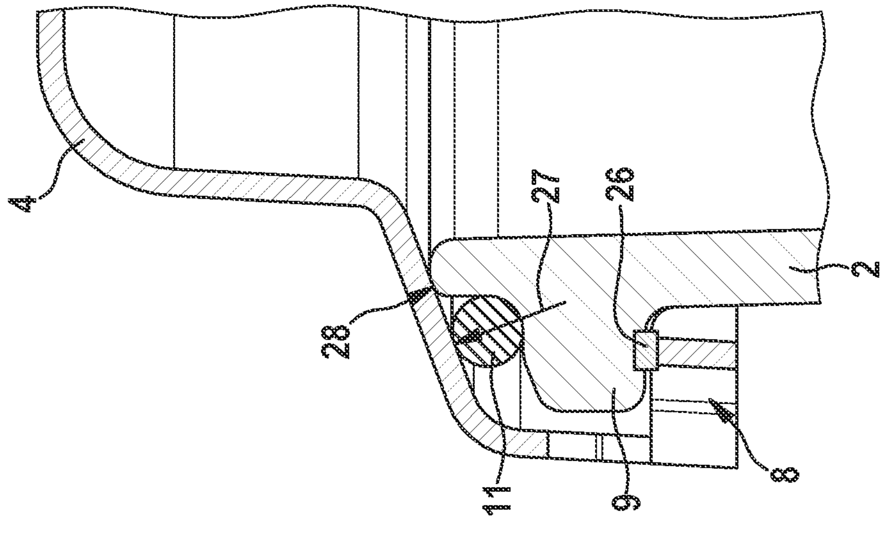

FIG. 3 shows an embodiment of a battery module 1 according to the invention in a sectional view.

In particular, it can be seen that the sealing element 11 is arranged between the lid element 4 and the housing element 2. In particular, the sealing element 11 is arranged between the lid element 4 and the rib 9 formed by the housing element 2.

Furthermore, it can be seen that a plastic deformation 8 is arranged below the rib 9. The plastic deformation 8 is furthermore arranged so as to be in direct mechanical contact with the rib 9.

A mechanical contact 26 is thereby formed.

Advantageously, a mechanical contact 28 is formed between the housing element 2 and the lid element 4, which comprises a so-called hard contact or stop.

By deformation of the sealing element 11 during manufacture and also over its lifetime, the sealing element 11 can form a return force 27, which results in the mechanical contact 26 formed between the plastic deformation 8 and the rib 9 being permanently and reliably established.

Figure 4:
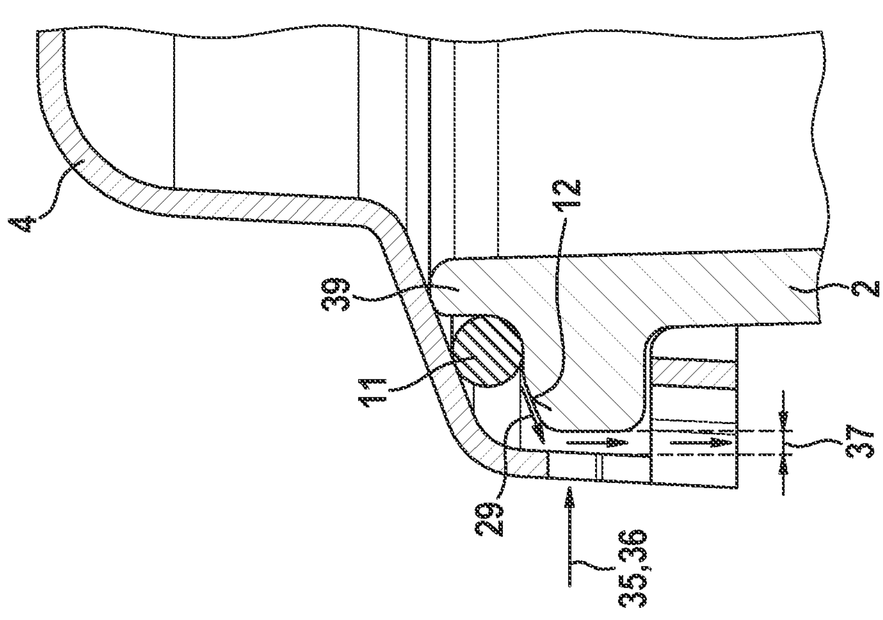

FIG. 4 shows an embodiment of a battery module 1 according to the invention in a sectional view.

The illustration of FIG. 4 corresponds to the illustration of FIG. 3. In addition, it can be seen here that, due to a protrusion 39 of the housing element 2 and in particular also the sealing element 11, the internal space 6 is sealed in a fluid-tight manner, in particular also against spray water 35 and jet water 36.

It can be seen that the sealing element 11 is arranged on a beveled surface 12. In particular, the beveled surface 12 is configured so as to be directly adjacent to the rib 9. In particular, the beveled surface 12 forms an angle to a horizontal during intended use of the battery module 1. A reliable drainage of a condensate 29 can thereby be achieved. In particular, this can prevent condensate 29 from remaining permanently on a sealing surface, and in particular the sealing element 11.

Further, the sealing element 11 and the protrusion 39 are arranged so as to be spaced apart from the recesses 13 so that spray water 35 and jet water 36 cannot directly hit and damage the sealing surface, and in particular the sealing element 11.

In addition, the lid element 4 and the housing element 2 are spaced apart in a lateral region of the battery module 1 by a distance 37 in such a way that capillary effects are avoided and condensate 29 can reliably drain off.

The invention claimed is:

1. A battery module comprising:

a housing element (2) made of a metallic material (3), and a lid element (4) made of a metal material (5), which are connected to one another while forming of a common internal space (6) configured so as to accommodate a plurality of battery cells (7) by the formation of a plurality of plastic deformations (8) of the lid element (4) that are spaced apart from one another, in such a way that an electrical contact is established between the housing element (2) and the lid element (4), wherein the housing element (2) comprises a circumferential rib (9), wherein the circumferential rib (9) is arranged so as to directly mechanically contact the plurality of plastic deformations (8), wherein the plurality of plastic deformations (8) are respectively arranged below the circumferential rib (9), wherein a sealing element (11) is further arranged between the housing element (2) and the lid element (4) in such a manner that the common internal space (6) is closed against an environment (10) in a fluid-tight manner, and wherein the sealing element 11) is arranged on a beveled surface (12).

2. The battery module according to claim 1, wherein the lid element (4) comprises a recess (13) directly adjacent to one of the plurality of plastic deformations (8).

3. The battery module according to claim 1, wherein the lid element (4) or the housing element (2) forms the sealing element (11).

4. The battery module according to claim 1, wherein the plurality of plastic deformations (8) are arranged so as to be spaced apart from one another and/or the housing element (2) of the battery module (1), and the lid element (4) are arranged so as to be spaced apart from one another in such a manner that an electromagnetic shielding of the common internal space (6) against an environment (10) is formed.

5. The battery module according to claim 1, wherein the housing element (2) is configured as an aluminum die-cast housing (20).

6. The battery module according to claim 1, wherein the lid element (4) is formed as a deep-drawn part (40) made of an aluminum alloy.

7. The battery module according to claim 1, wherein the sealing element (11) is arranged on the beveled surface (12) directly adjacent to the circumferential rib (9).

8. The battery module according to claim 1, wherein the metal material (3) of the housing element (2) is aluminum (30).

9. The battery module according to claim 1, wherein the metal material (5) of the lid element (4) is aluminum (50).

10. The battery module according to claim 1, wherein the plurality of plastic deformations (8) are arranged so as to be spaced apart from one another and/or the circumferential rib (9) of the housing element (2) of the battery module (1), and the lid element (4) are arranged so as to be spaced apart from one another in such a manner that an electromagnetic shielding of the common internal space (6) against an environment (10) is formed.

11. The battery module according to claim 1, wherein the housing element (2) includes a protrusion (39) adjacent the circumferential rib (9), the protrusion (39) being positioned inward of the sealing element (11) toward the common internal space (6), and wherein the protrusion (39) and the sealing element (11) seal the common internal space (6) in a fluid-tight manner.

* * * * *